United States Patent [19]

Burch et al.

[11] Patent Number: 5,296,586

[45] Date of Patent: Mar. 22, 1994

[54] PROCESS FOR PRODUCING POLYESTERS

[75] Inventors: Robert R. Burch, Exton, Pa.; Edward B. Jones, Hendersonville, Tenn.; Steven R. Lustig, Wilmington, Del.

[73] Assignee: E. I. Du Pont de Nemours and Company, Wilmington, Del.

[21] Appl. No.: 968,147

[22] Filed: Oct. 29, 1992

[51] Int. Cl.⁵ .............................................. C08G 63/78
[52] U.S. Cl. ................................. 528/274; 528/272; 528/279; 528/298; 528/300; 528/301; 528/302; 528/307; 528/308; 528/308.6; 525/437; 525/444; 524/390
[58] Field of Search ............... 528/272, 274, 279, 298, 528/300, 301, 302, 307, 308, 308.6; 525/437, 444; 524/390

[56] References Cited

U.S. PATENT DOCUMENTS

| | | | |
|---|---|---|---|
| 3,329,653 | 8/1967 | Beavers et al. | 528/176 |
| 3,925,295 | 12/1975 | Osborn et al. | 524/504 |
| 3,935,155 | 1/1976 | Osmond et al. | 524/504 |
| 3,985,700 | 10/1976 | Nicks et al. | 524/457 |
| 4,613,664 | 9/1986 | Tate et al. | 528/274 |

FOREIGN PATENT DOCUMENTS 61-236821 10/1986 Japan .

Primary Examiner—John Kight, III
Assistant Examiner—Sam A. Acquah
Attorney, Agent, or Firm—Susan Borden Evans

[57] ABSTRACT

Disclosed herein is a process for the production of polyester which involves heating a polymerizable monomer or oligomer in an inert liquid which does not dissolve or swell the monomer, oligomer, or polyester product, while boiling the inert liquid and codistilling the low molecular weight byproduct of the polymerization.

22 Claims, No Drawings

PROCESS FOR PRODUCING POLYESTERS

SUMMARY OF THE INVENTION

Disclosed herein is a process for the production of polyester which involves heating a polymerizable monomer or oligomer in an inert liquid which does not dissolve or swell the monomer, oligomer, or polyester product, while boiling the inert liquid and codistilling the low molecular weight byproduct of the polymerization.

TECHNICAL BACKGROUND

Polyesters are an important class of commercial polymers, being used as molding resins, fibers for industrial and textile use, and films. Therefore, improved processes for producing polyesters are continually sought.

U.S. Pat. No. 3,925,295 describes the preparation of polymer dispersions, including polyesters, by carrying out a condensation polymerization at a temperature of at least 150° C. in an inert liquid medium containing a polymeric emulsifying agent which disperses both the starting material and final polymer, to produce a polymer dispersion in the inert liquid. The polymeric emulsifying agent is an "impurity" in the polyester produced.

U.S. Pat. No. 4,613,664 describes the preparation of polyesters by heating a polymerizable oligomer in a specified inert medium (which may swell the oligomer and/or final polyester). No mention is made of boiling the inert medium to remove the low boiling byproduct of the condensation polymerization.

SUMMARY OF THE INVENTION

This invention involves a process for production of a polyester, comprising, heating and agitating one or more monomers or oligomers, that are capable of polymerizing to a polyester upon heating, in an inert liquid medium at a temperature at which said liquid medium boils, in the absence of a nonvolatile surfactant, provided that:

a volatile product of said polymerizing is removed by codistillation with said inert liquid medium;

said monomers and said polyester are not swollen nor dissolved by said inert liquid medium.

DETAILS OF THE INVENTION

This process involves heating polymerizable monomer(s) or oligomer(s) in an inert medium to effect polymerization. By a polymerizable monomer is meant a monomeric compound which can polymerize to a polymer, either by itself or with other monomers (which are also present). Examples of such compounds are bis(2-hydroxyethyl) terephthalate, bis(4-hydroxybutyl) terephthalate, bis(2-hydroxyethyl) naphthalenedioate, bis(2-hydroxyethyl) isophthalate, bis[2-(2-hydroxyethoxy)ethyl] terephthalate, bis[2-(2-hydroxyethoxy)ethyl] isophthalate, bis[(4-hydroxymethylcyclohexyl)methyl] terephthalate, bis[(4-hydroxymethylcyclohexyl)methyl] isophthalate, and a blend of bis(4-hydroxybutyl) terephthalate and polytetramethylene ether glycol, and their oligomers. Mixtures of these monomers and oligomers may also be used. By a polymerizable oligomer is meant any oligomer material which by itself can polymerize to a polyester. For example, reaction of dimethyl terephthalate or terephthalic acid with ethylene glycol, when carried out to remove methyl ester or carboxylic groups completely usually yields a mixture of bis(2-hydroxyethyl) terephthalate, low molecular weight polymers (oligomers) of bis(2-hydroxyethyl) terephthalate and oligomers of mono(2-hydroxyethyl) terephthalate (which contain carboxyl groups). This type of material is referred to herein as a "polymerizable oligomer". This oligomer may contain low molecular weight polyester, and varying amounts of the polymerizable monomer. Generally speaking, the less polymerizable monomer the oligomer contains, the higher the average molecular weight of the oligomer will be. Preferably, the oligomer will have an average degree of polymerization (average number of monomer units) of about 20 or less, more preferably about 10 or less. However, this process may also be used to further polymerize an already higher molecular weight polymer. Any of the monomers or oligomers used in the polymerization process should be relatively nonvolatile at the process temperature, preferably less than 2 percent, and more preferably less than 1 percent, of the total monomer and/or oligomer being volatilized (distilled with the inert medium) during the process.

Polyesters produced by the process include, but are not limited to, poly(ethylene terephthalate), poly(1,4-butylene terephthalate), poly(ethylene naphthalenedioate), poly(ethylene isophthalate), poly(3-oxa-1,5-pentadiyl terephthalate), poly(3-oxa-1,5-pentadiyl isophthalate), poly[1,4-bis(oxymethyl)cyclohexyl terephthalate], poly[1,4-bis(oxymethyl)cyclohexyl isophthalate], and the copolyester of polytetramethylene ether glycol and 1,4-butanediol with terephthalic acid. Poly(ethylene terephthalate) is especially preferred. Therefore, preferred monomers and oligomers are those monomers and oligomers that will produce the above mentioned polymers. In the polymerization process it is preferred to use only one monomer or oligomer so as to produce a "homopolyester". If more than one monomer or oligomer is used, a "copolyester" will be produced.

The inert liquid medium used herein does not swell or dissolve the monomer or oligomer, or polyester that is produced. By does not swell is meant that at the process temperature the monomer, oligomer or polymer imbibes less than about 20 weight percent of the medium, preferably less than about 10 weight percent of the medium. By does not dissolve in the medium is meant that at the process temperature the medium can dissolve less than 1 percent by weight of the monomer, oligomer or polymer, preferably less than about 0.1 percent by weight. It is also preferred if the low molecular weight product of the condensation polymerization does not dissolve in the inert medium, and is not swollen by the inert medium. The definitions of does not swell and does not dissolve are as in this paragraph, above. It is believed that if the low molecular weight byproduct is insoluble in the inert liquid medium, the polymerization will proceed faster. It is also easier to separate the low molecular weight product from the inert liquid medium if they are mutually immiscible. This facilitates recycling of both materials.

The process is carried out at the boiling point of the inert liquid medium. By boiling point is meant the temperature at which the vapor pressure of the inert liquid medium plus the vapor pressure of the low molecular weight product (if present) is equal to the pressure under which the process is being conducted. For instance, if being done at atmospheric pressure, it would be the atmospheric ("normal") boiling point. However, the process can be conducted at pressures greater than or less than atmospheric pressure, so that the boiling point would be the boiling point under that pressure. Although not critical, it is preferred to carry out the process at a pressure of about 10 kPa to about 1 MPa, more preferably about 100 kPa (atmospheric pressure).

The inert liquid medium may be any material which is liquid at the process temperature, and preferably liquid at ambient temperature, which meets the above criteria, and does not otherwise react itself, or interfere with the polymerization, during the process. Useful media, include, but are not limited to, alkanes, siloxanes, and partially and fully fluorinated hydrocarbons. Preferred liquid media are aliphatic alkanes having the desired boiling point. They may be pure alkanes such a n-tridecane and n-tetradecane, or may be mixtures of alkanes, such as petroleum distillate fractions having the proper boiling point. In the latter case, small amounts of other compounds, preferably less than 10 mole percent, such as cycloalkanes may also be present as long as the above criteria are still met.

In a condensation polymerization, a low molecular weight (by)product is produced. For instance, in the polymerization of bis(2-hydroxyethyl) terephthalate the low molecular weight product is ethylene glycol. It is preferred if the temperature at which the process is carried out is above the boiling point of the low molecular weight product at the pressure at which the process is performed, more preferred if the process temperature is at least about 25° C. above the boiling point of the low molecular weight product. In another preferred mode, the low molecular weight compound forms a lower boiling azeotrope with the inert liquid medium.

It is preferred to conduct the polymerization at 150° C. or higher, and more preferred at 200° C. or higher or at a temperature which provides a convenient polymerization rate. The process ingredients and product should be reasonably stable at the temperature at which the process is conducted. It may be advantageous to conduct the process under a blanket of inert gas such as nitrogen, to avoid oxidation of sensitive ingredients or product.

Since no surfactant is present in the polymerization, it is necessary to agitate the mixture of the inert liquid medium, starting materials and product polymer and keep these ingredients in suspension (usually as liquid droplets) while the polymerization is progressing. While the exact size of the droplets is not critical, smaller size is preferred, since it is believed that the finer these droplets are, the faster (up to a point) the polymerization will proceed. For any given set of conditions (inert liquid, process temperature, polymer being made, loading of monomer in the inert liquid, configuration of the stirrer and vessel, etc.) it is believed that for a given agitation (or shear rate), the polymer will coalesce to (eventually) a viscous mass at a given (average) molecular weight. Thus at any given set of conditions, including the shear rate due to agitation, the molecular weight of the polymer is believed to be in essence "self-limiting". In this type of process, the greater the agitation of the process mixture, the higher the resulting polymer (average) molecular weight will be. These self limiting values are easily obtained by simple experimentation for any given set of process conditions.

While the starting concentration of monomer and/or oligomer in the system may be as low as desired, it will normally be desired to keep this concentration as high as possible to obtain the maximum productivity from the equipment used. This maximum concentration will usually be dependent on the particular system to be polymerized, taking into account the amount of shear that can be applied by the agitator, and the desired molecular weight of the polyester product. Typically useful concentrations of product polymer in the inert liquid are up to about 50 percent by weight, preferably up to about 20 percent by weight.

When run under the optimum conditions described herein, the process rapidly produces polyesters which are easily separated from the other process ingredients (mainly the inert liquid medium), and which contain little if any impurities.

The reaction can be run in a number of ways, for instance, batch, semibatch or continuous, in one or more stages. In one preferred embodiment the reaction is run in a batch mode, with the initial concentration of monomer and/or oligomer and the agitation rate being carefully controlled so that the polymer coalesces at the desired (average) molecular weight. Usually the polymer will be more dense than the inert liquid medium, and so can be drawn off as a liquid through the bottom of the polymerization vessel. In another preferred mode, the process is a continuous polymerization, using what is commonly called the continuous stirred tank reactor system. Inert liquid medium and monomer and/or oligomer are fed at a constant rate to continually make up for the inert liquid medium and low molecular weight product removed by distillation, as well as the inert liquid medium and suspended product polymer which is being removed at a constant rate. Other modes of performing the process will be evident to the artisan.

Other conventional polymerization ingredients may also be present in the process, for example a polymerization catalyst and/or an antioxidant. Suitable catalysts include, but are not limited to, titanates, Sb(III) glycolates, Sb(III) alcoholates, and Bronsted acids, and are used at conventional concentrations.

It is believed the inert liquid medium can be recycled back to the process without further purification if the low molecular weight product is insoluble in the inert medium. If that occurs, the low molecular weight product may be recycled back to making monomer or oligomer, often without further purification.

In the Examples, all polymerizations were run under a nitrogen atmosphere.

In the Examples, the following abbreviations are used:
GPC — gel permeation chromatography
Mn — number average molecular weight
Mw — weight average molecular weight
Mv — viscosity average molecular weight

EXAMPLE 1

A 1-liter three neck flask with Vigreaux column and condenser, paddle stirrer, and stopper in the third neck was charged with 48 g of bis(2-hydroxyethyl) terephthalate, 4 g of ethylene glycol, 400 g of tetradecane, and no catalyst. After approximately 5 hours a viscous layer had formed in the bottom of the three neck flask. The reaction was refluxed for a total of 5.5 hours, during which time approximately 49.5 mL of a mixture of tetradecane and ethylene glycol distilled over. At that pointed the heat source was turned off, allowing the polymer to harden into one solid chunk, which was separated from the tetradecane. The chunk of polymer weighed 18.0 g. This polymer had an inherent viscosity of 0.14 dL/g in hexafluoroisopropanol at 0.5 wt. %, and the GPC showed in hexafluoroisopropanol: Mn=7620, Mw=12500, Mz=20600, Mv=11600.

EXAMPLE 2

A 1-liter three neck flask with condenser, paddle stirrer, and a stopper in the third neck was charged with 40 g bis(2-hydroxyethyl) terephthalate, 400 g tetradecane, and 0.0033 g titanium(IV) propoxide as catalyst. The mixture was heated to reflux and agitated at 540 rpm for 1.25 hours, during which time a plug of polymer weighing 23.4 g separated out. This polymer had an inherent viscosity of 0.72 dL/g in hexafluoroisopropanol at 30° C. and 0.5 wt. %. The GPC (hexafluoroisopropanol solution, polyethylene terephthalate standards) showed Mn=21000, Mw=49200, Mz=96700.

EXAMPLE 3

A 1-liter three neck flask with condenser, paddle stirrer, and a stopper in the third neck was charged with 250 g of trimethyl silyl terminated polydimethyl siloxane (Huls, Inc., bp 220° to 300° C.), 30 g bis(2-hydroxyethyl) terephthalate, and 0.004 g titanium(IV) propoxide as catalyst. The reaction mixture was heated to reflux with vigorous stirring for 2 hours. The polymer separated from the slurry at the end of the polymerization. The polymer showed in the GPC (hexafluoroisopropanol, polyethylene terepthalate standards): Mn=21600, Mw=60000, Mz=111000, Mv=53400.

EXAMPLE 4

A 1-liter four neck flask with condenser, paddle stirrer, nitrogen inlet, and addition funnel containing additional purified tetradecane was charged with 40.0 g bis(2-hydroxyethyl) terephthalate, 0.006 mL of titanium (IV) propoxide, and 400 mL of tetradecane, purified by passing it down a column of acidic alumina and sparging it with dry nitrogen. The reaction mixture was heated to reflux with vigorous stirring for 2 hours. As tetradecane and ethylene glycol distilled from the polymerization, tetradecane was added from the addition funnel in order to keep the volume of the polymerization medium constant after cooling at the end of the polymerization, a solid plug of polymer was isolated from the polymerization, which had an inherent viscosity of 0.74 dL/g in hexafluoroisopropanol at 30° C. and a concentration of 0.5 wt. %. The GPC (hexafluoroisopropanol, polyethylene terepthalate standards) showed: Mn=20000, Mw=48300, Mz=85000, Mv=43600.

EXAMPLE 5

This polymerization was similar to Example 2, except the flask had four indentations equally spaced around the body of the flask to give greater agitation and to promote mixing as the suspension was stirred. The flask was charged with 40.0 g of bis(2-hydroxyethyl) terephthalate, 0.006 mL of titanium(IV) propoxide, and 400 mL of tetradecane, purified as in Example 4. The mixture was heated to reflux and agitated at 540 rpm for 30 minutes. During this time, additional tetradecane was syringed into the reaction flask to keep the volume of polymerizing medium approximately constant. At the end of the polymerization, 20.2 g of product had separated out of the suspension, which product had an inherent viscosity of 0.49 dL/g in hexafluoroisopropanol at 30° C. and 0.5 wt. %. The GPC (hexafluoroisopropanol, polyethylene terepthalate standards) showed: Mn=9550, Mw=26000, Mz=53800, Mv=22700.

EXAMPLE 6

A sample of polyethylene terephthalate prepared by these suspension polymerization methods had an inherent viscosity in hexafluoroisopropanol of 0.71 dL/g with a diethylene glycol content of 0.35% and an acid end-group content of 11.9 Meq./kg. A second sample of polyethylene terephthalate prepared by these suspension polymerization methods had an inherent viscosity in hexafluoroisopropanol of 0.66 dL/g with a diethylene glycol content of 0.46% and an acid end-group content of 2.00 Meq./kg, showing that the suspension polymerization yields polyethylene terephthalate with low diethylene glycol and acid end concentrations.

EXAMPLE 7

A 1-liter, four-neck flask with Vigreaux column and condenser, paddle stirrer, nitrogen inlet, and addition funnel was charged with 40.0 g of bis(2-hydroxyethyl) terephthalate and 400 mL of hexadecane. The catalyst solution, which was 6.0 μL of titanium n-propoxide in 6.0 mL of tetradecane was added by syringe at the first visual evidence of boiling. The hexadecane had been previously purified by passing down a column of acidic alumina and then bubbling nitrogen through it for 45 minutes. The mixture was heated to boiling and stirred at 500 rpm for 35 minutes, during which time additional hexadecane was added from the addition funnel to the reaction vessel to maintain a constant volume of the polymerization medium. During the polymerization, 340 mL of a hexadecane/tetradecane/ethylene glycol mixture distilled over and a melt pool of polymer separated out. At the end of 35 minutes, the heat source and stirring were turned off, and a plug of polyethylene terephthalate weighing 18.3 g was isolated. The polymer had an inherent viscosity of 0.826 dL/g in a 1:3 mixture of trifluoroacetic acid/methylene chloride at 25° C. and 0.50 g/dL. The GPC showed (hexafluoroisopropanol, polyethylene terepthalate standards): Mn=24900, Mw=65800.

EXAMPLE 8

A 1-liter, four-neck flask with Vigreaux column and condenser, paddle stirrer, nitrogen inlet, and addition funnel was charged with 40.0 g of bis(2-hydroxyethyl) terephthalate and 400 mL of hexadecane. The catalyst solution, which was 6.0 μL of titanium n-propoxide in 6.0 mL of tetradecane, was added at the first visual evidence of boiling. The hexadecane had been previously purified by passing down a column of acidic alumina and then bubbling nitrogen through it for 45 minutes. The mixture was heated to boiling and stirred at 500 rpm for 20 minutes, during which time additional hexadecane was added from the addition funnel to the reaction vessel to maintain a constant volume of the polymerization medium. During the polymerization, approximately 200 mL of a hexadecane/tetradecane/ethylene glycol mixture distilled over and a melt pool of polymer separated out. At the end of 20 minutes, the heat source and stirring were turned off, and a plug of polyethylene terephthalate weighing 25.0 g was isolated. The polymer showed in the GPC (hexafluoroisopropanol, polyethylene terephthalate standards): Mn=16300, Mw=36400.

EXAMPLE 9

A 1-liter, four-neck flask with Vigreaux column and condenser, paddle stirrer, nitrogen inlet, and stopper in the fourth neck was charged with 40.0 g of bis(2-hydroxyethyl) terephthalate and 400 mL of tetradecane. The catalyst solution, which was 6.0 μL of titanium n-propoxide in 6.0 mL of tetradecane, was added by syringe at the first visual evidence of boiling. The tetradecane had been previously purified by passing down a column of acidic alumina and then bubbling nitrogen through it for 45 minutes. The mixture was heated to boiling and stirred at 500 rpm. The temperature of the vapors as distillation took place was 190° C. for the tetradecane/ethylene glycol azeotrope. After 3 minutes, the temperature rose to 205° C., at which point the stirring was immediately stopped and the heat source removed. During this time, 92.5 g of tetradecane/ethylene glycol mixture distilled. Polyethylene terephthalate (27.3 g) was isolated from the reaction, which showed in the GPC (hexafluoroisopropanol, polyethylene terephthalate standards): Mn=4380, Mw=5640, Mz=7490, Mp=4760.

EXAMPLE 10

A 1-liter, four-neck flask with Vigreaux column and condenser, paddle stirrer, nitrogen inlet, and an addition funnel containing tetradecane was charged with 40.0 g of bis(2-hydroxyethyl) terephthalate and 400 mL of tetradecane. Fifteen μL of antimony (III) ethoxide as catalyst was added by syringe at the first visual evidence of boiling. The tetradecane had been previously purified by passing down a column of acidic alumina and then bubbling nitrogen through it for 45 minutes. The mixture was heated to boiling and stirred at 500 rpm for 35 minutes, during which time approximately 225 mL of a tetradecane/ethylene glycol mixture distilled. As the polymerization proceded, tetradecane was added from the addition funnel to maintain an approximately constant volume of heating medium. At the end of the polymerization, a solid plug of polyethylene terephthalate weighing 30.0 g was isolated, which showed in the GPC (hexafluoroisopropanol, polyethylene terephthalate standards): Mn=14300, Mw=36600.

EXAMPLE 11

This example shows the effect of stirring rate on the rate of polymerization. A series of polymerizations were conducted, each with a 1-liter, four-neck flask with Vigreaux column and condenser, paddle stirrer, nitrogen inlet, and stopper in the fourth neck was charged with 40.0 g of bis(2-hydroxyethyl) terephthalate and 400 mL of tetradecane. The catalyst solution, which was 6.0 μL of titanium n-propoxide as a solution in 6.0 mL of tetradecane, was added by syringe at the first visual sign of boiling. The tetradecane had been previously purified by passing down a column of acidic alumina and then bubbling nitrogen through it for 45 minutes. The mixture was heated to boiling and stirred at various rates. All polymerizations were run for 35 minutes, at which point the agitation was turned off and the heat source removed, and the polyethylene terephthalate product was isolated as a solid plug. During the polymerization, approximately 250 mL of a tetradecane/ethylene glycol mixture distilled. A table summarizing the GPC analysis of the product polyethylene terephthalate as a function of stirring rate is shown below. The data shows that the rate of polymerization increases with increasing stirring rate up to approximately 300 rpm. Further increases in stirring rate do not increase the polymerization rate, although the optimal stirring rate should be dependent on the geometry of the polymerization vessel and stirring apparatus.

| Stirring Rate (rpm) | Mn | Mw |
| --- | --- | --- |
| 125 | 6280 | 9300 |
| 210 | 11000 | 20900 |
| 300 | 16200 | 36700 |
| 500 | 10900 | 35000 |
| 700 | 17300 | 36600 |
| 900 | 10000 | 29100 |

EXAMPLE 12

A 1-liter, four-neck flask with vigreaux column and condenser, paddle stirrer, nitrogen inlet, and powder addition funnel containing 40.0 g of bis(2-hydroxyethyl) terephthalate was charged with 400 mL of tetradecane. The tetradecane had been previously purified by passing down a column of acidic alumina and then bubbling nitrogen through it for 45 minutes. The tetradecane was heated to boiling at which point the catalyst solution, which was 6.0 μL of titanium n-propoxide as a solution in 6.0 mL of tetradecane, was added by syringe. The temperature of the vapors at this point was 255° C. The mixture was agitated at approximately 540 rpm for the duration of the experiment. The bis(2-hydroxyethyl) terephthalate was added to the polymerization vessel by means of the powder addition funnel over the course of 20 minutes. The polymerization was continued for an additional 20 minutes, at which point the stirring was stopped and the heat source removed. A solid plug of polyethylene terephthalate weighing 29.0 g was isolated from the polymerization vessel. GPC (hexafluoroisopropanol, polyethylene terephthalate standards) on this sample showed Mn=7590, Mw=19600.

EXAMPLE 13

A 1-liter, four-neck flask with Vigreaux column and condenser, paddle stirrer, nitrogen inlet, and an addition funnel containing tridecane was charged with 20.0 g of bis(2-hydroxyethyl) terephthalate and 400 mL of tridecane. Six μL of titanium(IV) n-propoxide as a solution in 6.0 mL of tetradecane was added by syringe at the first visual evidence of boiling. The tridecane had been previously purified by passing down a column of acidic alumina and then bubbling nitrogen through it for 45 minutes. The mixture was heated to boiling and stirred at 500 rpm for 1 hour, during which time approximately 350 mL of a tridecane/ethylene glycol mixture distilled. Tridecane was added from the addition funnel during the polymerization to maintain an approximately constant volume of heating medium. At the end of 1 hour, the stirring was stopped and the heat source was removed. A porous sample of polyethylene terephthalate was isolated from this polymerization, which had an inherent viscosity in hexafluoroisopropanol of 0.51 dL/g and an Mn=12700, Mw=32500 by GPC (hexafluoroisopropanol, polyethylene terephthalate standards).

EXPERIMENT 1

Procedure for determining tetradecance content in polyethylene terephthalate. Polyethylene terephthalate samples previously exposed to tetradecane at its boiling point, were broken up into granules approximately 1 mm in size by means of a Wiley mill. Known quantities of polyethylene terephthalate were then dissolved in a known amount of a solution of 30 g of phenol in 40 mL of tetrachloroethylene by gently refluxing the mixture. Gas chromatography was then used to provide a quantitative determination of tetradecane content, which showed for one sample 2.2 % weight percent tetradecane, another sample 1,170 ppm tetradecane, and a third showed 680 ppm tetradecane.

EXPERIMENT 2

Procedure for determining the mutual solubility of the condensation by-product and the heating medium. The condensation by-product, such as ethylene glycol, and the heating medium, such as tetradecane, are heated and stirred at a pre-determined temperature for a sufficient period of time to allow equilibration, typically several minutes. The relative amounts of condensation by-product and heating medium are not crucial but for convenience are preferably about equal volumes. After equilibration, the stirring is stopped to allow the mixture to separate into two distinct layers. Aliquots of each layer are withdrawn and dissolved in a common solvent for the condensation by-product and the heating medium. For example, for the ethylene glycol/tetradecane system, acetone is a good choice for the common solvent. The relative amounts of condensation by-product and heating medium are then determined in each aliquot by gas chromatography. A polymerization run for 3 minutes showed 53% hexadecane and 47% ethylene glycol in the distillate.

EXAMPLE 14

A 500 ml flask with a 10.2 cm diameter was equipped with four baffles each projecting 1.59 cm into the vessel. These baffles were supported by a 0.32 cm retaining ring allowing 0.32 cm gap between the outer edge of the baffles and the wall of the reactor. The flask was agitated using a metal shaft holding three 6.03 cm turbine agitators (Fisher 14-505-20 type T and P). This shaft was rotated at 1200 rpm yielding a tip speed of about 229 m/min. The flask was also equipped with a 30.5 cm Vigreaux partial condenser leading to a distillation head. The flask was charged with 67.8 g of a bis(2-hydroxyethyl) terephthalate monomer which was produced by reacting dimethyl terephthalate with ethylene glycol in the presence of tetra isopropyl titanate such that the concentration of titanium in this monomer was 15.5 ppm. No additional catalyst was added to the charge. The flask was also charged with 288.2 g of tetradecane and blanketed with a stream of nitrogen (0.0057 m$^3$/h). The mixture was then heated to the boiling point of the tetradecane (254° C.) and agitated rapidly under the conditions noted above. The ethylene glycol polycondensation by-product, released as the monomer underwent the initial phases of polymerization, was co-distilled out with tetradecane over a period of 1 hour. Rapid stirring was then continued for 25 minutes until a separate melt phase of polymer was formed. This material had an inherent viscosity of 0.62 dL/g in hexafluoroisopropanol at 30° C. at a concentration of 0.5 wt. %.

EXAMPLE 15

A 500 ml flask equipped with a paddle agitator, Vigreaux condenser leading to a distillation head, plus a nitrogen inlet, was charged with 132.9 g of a bis(2-hydroxyethyl) terephthalate monomer and 188.2 g of tetradecane. This monomer was produced from dimethyl terephthalate plus ethylene glycol using ~16ppm titanium from tetraisopropyl titanate. The reaction was then heated to the boil for 1 hour, during which time the stoichiometric quantity of the ethylene glycol by-product plus 57 mL of the tetradecane heating media were codistilled. The mixture was then allowed to cool. A solid polymer was formed with inherent viscosity of 0.25 dL/g (same conditions as Example 14).

What is claimed is:

1. A process for production of a polyester, comprising, heating and agitating one or more monomers or oligomers, polymerizable to a polyester upon heating, in an inert liquid medium at a temperature at which said liquid medium boils, in the absence of a nonvolatile surfactant, provided that:

a volatile product of said polymerizing is removed by codistillation with said inert liquid medium;

said monomers and said polyester are not swollen nor dissolved by said inert liquid medium.

2. The process as recited in claim 1 wherein said temperature is at least about 150° C.

3. The process as recited in claim 1 wherein said temperature is at least about 200° C.

4. The process as recited in claim 1 wherein said monomer, monomers, oligomer or oligomers are bis(2-hydroxyethyl) terephthalate, bis(4-hydroxybutyl) terephthalate, bis(2-hydroxyethyl) naphthalenedioate, bis(2-hydroxyethyl) isophthalate, bis[2-(2-hydroxyethoxy)ethyl] terephthalate, bis[2-(2-hydroxyethoxy)ethyl] isophthalate, bis[(4-hydroxymethyl-cyclohexyl)methyl] terephthalate, bis[(4-hydroxymethylcyclohexyl)methyl] isophthalate, mono (2-hydroxyethyl) terephthalate, or a blend of bis(4-hydroxybutyl) terephthalate and polytetramethyleneether glycol.

5. The process as recited in claim 3 wherein said monomer, monomers, oligomer or oligomers are bis(2-hydroxyethyl) terephthalate, bis(4-hydroxybutyl) terephthalate, bis(2-hydroxyethyl) naphthalenedioate, bis(2-hydroxyethyl) isophthalate, bis[2-(2-hydroxyethoxy)ethyl] terephthalate, bis[2-(2-hydroxyethoxy)ethyl] isophthalate, bis[(4-hydroxymethylcyclohexyl)methyl] terephthalate, bis[(4-hydroxymethylcyclohexyl)methyl] isophthalate, mono(2-hydroxyethyl) terephthalate, or a blend of bis(4-hydroxybutyl) terephthalate and polytetramethyleneether glycol.

6. The process as recited in claim 1 wherein one monomer or one oligomer is used, and said monomer is bis(2-hydroxyethyl) terephthalate or bis(4-hydroxybutyl) terephthalate, and said oligomer is an oligomer of bis(2-hydroxyethyl) terephthalate or bis(4-hydroxybutyl) terephthalate.

7. The process as recited in claim 3 wherein one monomer or one oligomer is used, and said monomer is bis(2-hydroxyethyl) terephthalate or bis(4-hydroxybutyl) terephthalate, and said oligomer is an oligomer of bis(2-hydroxyethyl) terephthalate or bis(4-hydroxybutyl) terephthalate.

8. The process as recited in claim 1 wherein a polymerization catalyst is present.

9. The process as recited in claim 3 wherein a polymerization catalyst is present.

10. The process as recited in claim 5 wherein a polymerization catalyst is present.

11. The process as recited in claim 7 wherein a polymerization catalyst is present.

12. The process as recited in claim 1 wherein said inert liquid medium can dissolve less than 1 weight percent of said monomer, oligomer or polyester at said temperature.

13. The process as recited in claim 1 wherein said monomer, oligomer or polyester can imbibe less than 20 weight percent of said inert liquid medium at said temperature.

14. The process as recited in claim 1 wherein said low boiling product is not soluble in nor swollen by said inert liquid medium.

15. The process as recited in claim 1 wherein said inert liquid medium is an alkane or a mixture of alkanes.

16. The process as recited in claim 5 wherein said inert liquid medium is an alkane or a mixture of alkanes.

17. The process as recited in claim 1 run as a batch process.

18. The process as recited in claim 1 run in a continuous stirred tank reactor system.

19. The process as recited in claim 1 carried out at atmospheric pressure.

20. The process as recited in claim 1 wherein said temperature is at least about 25° C. above said low molecular weight compound's boiling point.

21. The process as recited in claim 1 wherein one monomer or oligomer is used.

22. The process as recited in claim 1 wherein said polyester separates as a molten mass from said inert liquid medium.

* * * * *